(12) United States Patent
Possehl et al.

(10) Patent No.: US 7,287,512 B2
(45) Date of Patent: Oct. 30, 2007

(54) THROTTLE POSITION SENSOR

(75) Inventors: Kelly Possehl, Elkhorn, WI (US); Sam Palfenier, El Paso, TX (US); Allen Lehmen, Iron Ridge, WI (US); Jeff Richlen, Greendale, WI (US); William E. Crowe, Wauwatosa, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 30 days.

(21) Appl. No.: 11/329,347

(22) Filed: Jan. 10, 2006

(65) Prior Publication Data

US 2007/0157902 A1 Jul. 12, 2007

(51) Int. Cl.
F02D 11/04 (2006.01)
B62K 21/12 (2006.01)

(52) U.S. Cl. .................................... 123/400

(58) Field of Classification Search ............... 123/400, 123/376; 74/484 R–489, 504, 551.1, 551.2, 74/551.3, 551.4, 551.5, 551.6, 551.7, 551.8, 74/551.9
See application file for complete search history.

(56) References Cited

U.S. PATENT DOCUMENTS

| | | | |
|---|---|---|---|
| 2,796,773 A | 6/1957 | Wooler et al. | |
| 3,368,639 A | 2/1968 | Deane | |
| 4,137,793 A | 2/1979 | Sowell | |
| 4,191,065 A | 3/1980 | Golobay et al. | |
| 4,212,459 A | 7/1980 | Wolf | |
| 4,286,699 A | 9/1981 | Pawelka | |
| 4,286,700 A | 9/1981 | Morris et al. | |
| 4,528,590 A | 7/1985 | Bisacquino et al. | |
| 4,580,537 A | 4/1986 | Uchiyama | |
| 4,701,740 A | 10/1987 | Reuss et al. | |
| 4,944,269 A | 7/1990 | Imoehl | |
| 4,958,607 A | 9/1990 | Lundberg | |
| 5,222,572 A | 6/1993 | Yamagiwa et al. | |
| 5,241,936 A | 9/1993 | Byler et al. | |
| 5,295,409 A | 3/1994 | Byram et al. | |
| RE34,574 E | 4/1994 | Imoehl | |
| 5,318,000 A | 6/1994 | Binnewies et al. | |
| 5,408,899 A | 4/1995 | Stewart | |
| 5,450,054 A | 9/1995 | Schmersal | |

(Continued)

FOREIGN PATENT DOCUMENTS

DE 4139429 6/1993

(Continued)

*Primary Examiner*—Hai Huynh
(74) *Attorney, Agent, or Firm*—Michael Best & Friedrich LLP

(57) ABSTRACT

The present invention provides a throttle position sensor for a motorcycle including a handlebar having an end. The throttle position sensor includes a rotor having a first end and a second end. The rotor is positioned within the handlebar and rotated relative to the handlebar. The second end is closer than the first end to the end of the handlebar. The throttle position sensor also includes a sensor operable to detect rotation of the rotor relative to the handlebar and generate a signal corresponding to the rotation of the rotor relative to the handlebar. The throttle position sensor further includes at least one electrical conduit passing into the rotor from the first end. The at least one electrical conduit is routed through the rotor and is accessible from the second end of the rotor.

20 Claims, 11 Drawing Sheets

U.S. PATENT DOCUMENTS

| | | | |
|---|---|---|---|
| 5,507,201 A | 4/1996 | Fairbairn et al. | |
| 5,529,296 A | 6/1996 | Kato et al. | |
| 5,540,174 A | 7/1996 | Kishi et al. | |
| 5,661,890 A | 9/1997 | Pfaffenberger | |
| 5,756,890 A | 5/1998 | Fedison, Jr. | |
| 5,768,946 A | 6/1998 | Fromer et al. | |
| 5,789,884 A | 8/1998 | Hancock | |
| 5,812,050 A | 9/1998 | Figgins | |
| 5,861,745 A | 1/1999 | Herden | |
| 5,886,490 A | 3/1999 | Miller et al. | |
| 5,887,488 A | 3/1999 | Riggle | |
| 6,005,473 A | 12/1999 | Ishihara | |
| 6,019,016 A | 2/2000 | Takagi et al. | |
| 6,089,120 A | 7/2000 | Löchle et al. | |
| 6,135,227 A | 10/2000 | Laning | |
| 6,144,125 A | 11/2000 | Birkestrand et al. | |
| 6,158,299 A | 12/2000 | Czajkowski | |
| 6,263,859 B1 | 7/2001 | Kalsi | |
| 6,276,230 B1 | 8/2001 | Crum et al. | |
| 6,296,072 B1 * | 10/2001 | Turner | 180/220 |
| 6,318,490 B1 | 11/2001 | Laning | |
| 6,371,890 B1 | 4/2002 | Schell | |
| 6,426,619 B1 | 7/2002 | Pfaffenberger et al. | |
| 6,515,473 B2 | 2/2003 | Pfaffenberger et al. | |
| 6,551,153 B1 | 4/2003 | Hattori | |
| 6,576,890 B2 * | 6/2003 | Lin et al. | 250/231.14 |
| 6,581,714 B1 | 6/2003 | Kamen et al. | |
| 6,629,574 B2 * | 10/2003 | Turner | 180/206 |
| 6,699,085 B2 | 3/2004 | Hattori | |
| 6,840,096 B2 * | 1/2005 | Samoto et al. | 73/118.1 |
| 6,894,485 B2 * | 5/2005 | Green et al. | 324/207.2 |
| 6,920,805 B2 * | 7/2005 | Samoto et al. | 74/485 |
| 6,978,694 B2 | 12/2005 | Peppard | |
| 7,010,955 B2 * | 3/2006 | Suzuki | 73/1.79 |
| 2004/0011777 A1 | 1/2004 | Richlen | |
| 2004/0216550 A1 * | 11/2004 | Fallak et al. | 74/551.9 |

FOREIGN PATENT DOCUMENTS

| | | |
|---|---|---|
| DE | 19547408 A1 * | 7/1997 |
| DE | 10027193 A1 * | 12/2001 |
| JP | 63138138 | 6/1988 |
| JP | 4254278 | 9/1992 |
| JP | 6344968 | 12/1994 |
| WO | WO 99/25605 | 11/1998 |

* cited by examiner

THROTTLE POSITION SENSOR

FIELD OF THE INVENTION

This invention relates generally to motorcycles, and more particularly to throttle position sensors for motorcycles.

BACKGROUND OF THE INVENTION

Motorcycle owners often purchase various accessories for their motorcycles. Among other accessories, a motorcycle owner may purchase handlebar lights and heated throttle grips for their motorcycle. Such handlebar lights are commonly installed at the ends of the respective handlebars, and the heated throttle grips are installed in place of the original throttle grips.

To provide electrical power to the handlebar lights or heated throttle grips, electrical wires or cords can be routed through the interior passageway of the hollow, tubular handlebars to electrically connect to a source of power, such as the motorcycle's battery. However, in circumstances where the interior passageway is obstructed, such as when a throttle position sensor for an electronic throttle is located inside the interior passageway, the electrical wires for the handlebar accessories are routed outside of the handlebars.

SUMMARY OF THE INVENTION

The present invention provides, in one aspect, a throttle position sensor for a motorcycle including a handlebar having an end. The throttle position sensor includes a rotor having a first end and a second end. The rotor is positioned within the handlebar and rotated relative to the handlebar. The second end is closer than the first end to the end of the handlebar. The throttle position sensor also includes a sensor operable to detect rotation of the rotor relative to the handlebar and to generate a signal corresponding to the rotation of the rotor relative to the handlebar. The throttle position sensor further includes at least one electrical conduit passing into the rotor from the first end. The electrical conduit is routed through the rotor and is accessible from the second end of the rotor.

The present invention provides, in another aspect, a throttle assembly for a motorcycle including a handlebar having an end. The throttle assembly includes a throttle position sensor having a first end and a second end. The throttle position sensor is positioned within the handlebar such that the second end is closer than the first end to the end of the handlebar. The throttle position sensor includes a first electrical terminal accessible from the second end. The throttle assembly also includes a throttle grip positioned over the end of the handlebar. The throttle grip engages the throttle position sensor and is rotatable to provide a throttle angle input to the throttle position sensor such that the throttle position sensor generates a signal corresponding to the throttle angle input. The throttle assembly further includes an electrical component having a second electrical terminal electrically connecting with the first electrical terminal.

In another embodiment of the present invention, the throttle position sensor includes a rotor having a first plurality of splines extending from an outer surface of the rotor, and the throttle grip includes a second plurality of splines extending from an interior surface of the throttle grip. The first and second plurality of splines are engageable in a plurality of orientations with respect to each other.

Other features and aspects of the invention will become apparent by consideration of the following detailed description and accompanying drawings.

BRIEF DESCRIPTION OF THE DRAWINGS

In the drawings, wherein like reference numerals indicate like parts:

FIG. 9b is an assembled, reverse perspective view of the rotor of FIG. 9a.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
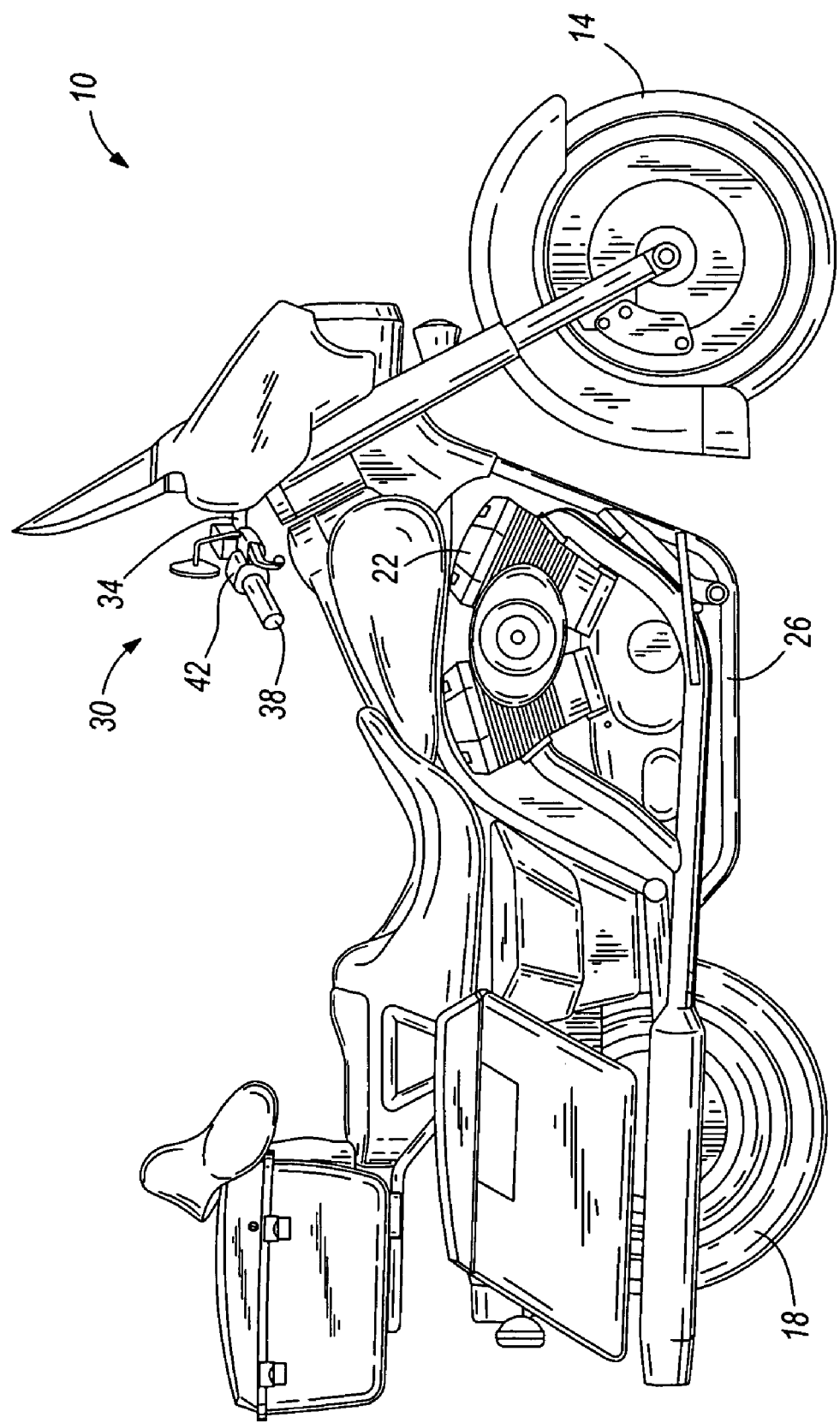
FIG. 1 is a side view of a motorcycle embodying the present invention.

FIG. 1 illustrates a motorcycle 10 including a front wheel 14, a rear wheel 18, an engine 22, and a frame 26 interconnecting the front and rear wheels 14, 18. The motorcycle 10 also includes a steering assembly 30 coupled to the frame 26. The steering assembly 30 is pivotable about a steering axis and includes a handlebar 34 for imparting such pivotal motion to the steering assembly 30. The handlebar 34 includes a left-side grip (not shown) and a right-side grip 38 that are grasped by an operator to control the motorcycle 10.

The left-side grip is secured to the left-hand end portion of the handlebar 34, and the right-side grip or throttle grip 38 is secured to the right-hand end portion of the handlebar 34. A left control housing (not shown) is positioned inwardly of the left-side grip, and a right control housing 42 is positioned inwardly of the throttle grip 38. The left control housing and right control housing 42 are secured to the motorcycle handlebar 34. The left control housing and right control housing 42 include operator switches that communicate with and control various devices on the motorcycle 10, such as the headlight, the starter, the turn signals, the horn, and other devices as is well known in the art. The illustrated handlebar 34 is a generally continuous hollow tube made from metal such as steel. However, it should be appreciated that other types of handlebars such as two-piece handlebars (e.g., "clip-ons") may also be used in accordance with the present invention.

Figure 2:
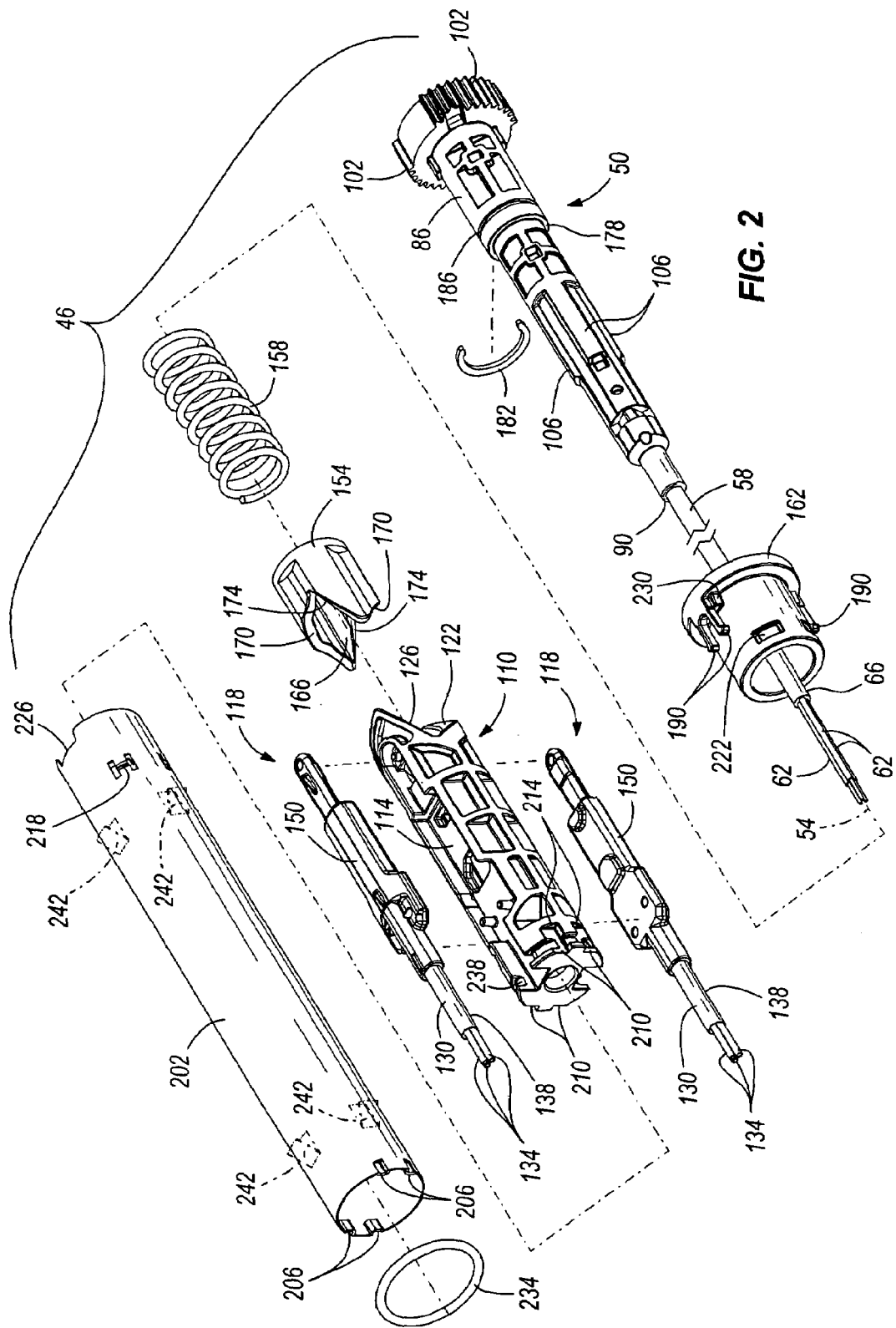
FIG. 2 is an exploded, perspective view of a throttle position sensor embodying the present invention.
Figure 3:
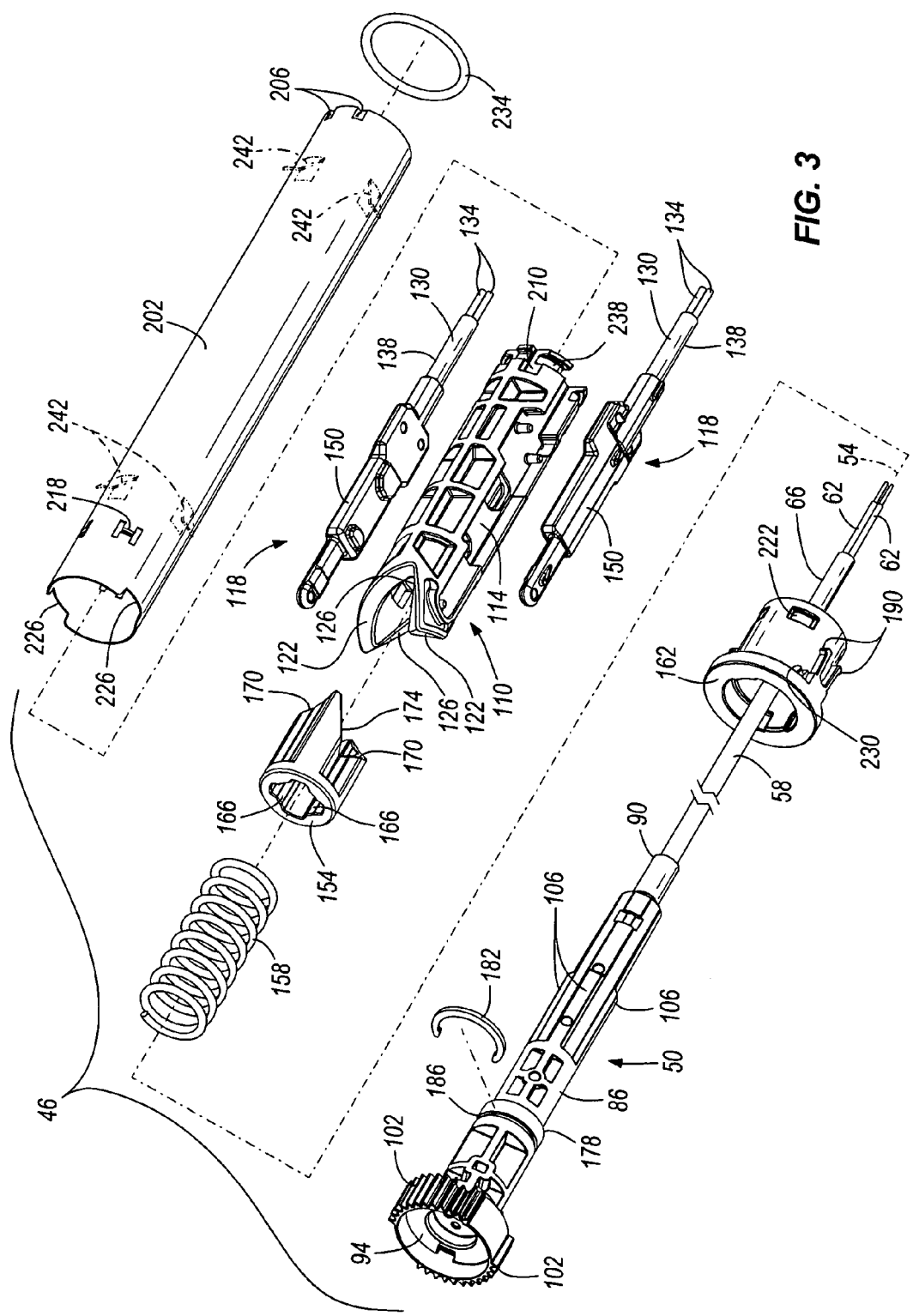
FIG. 3 is an exploded, reverse perspective view of the throttle position sensor of FIG. 2.
Figure 9A:
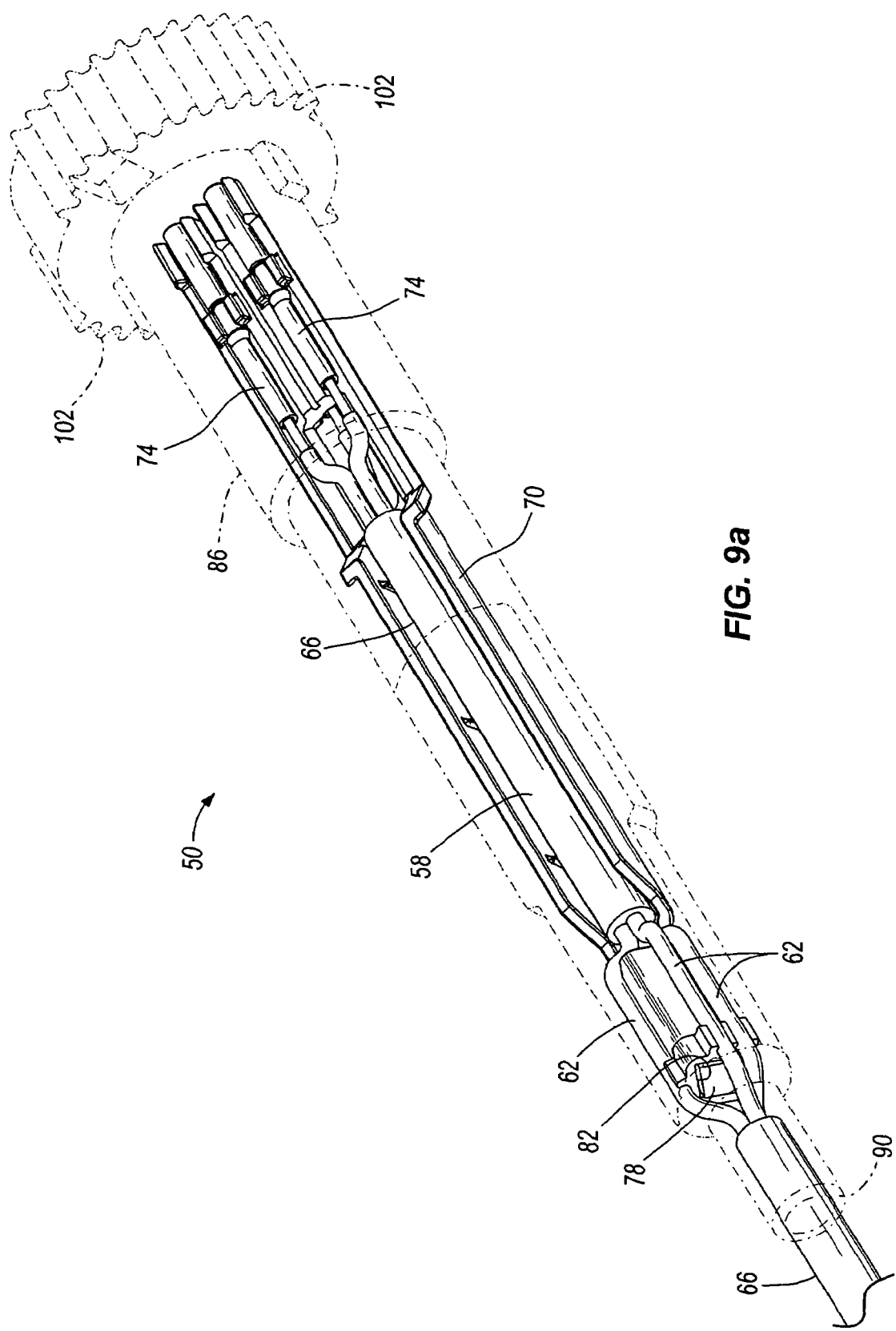
FIG. 9a is an assembled, perspective view of a rotor of the throttle position sensor of FIG. 2.
Figure 9B:
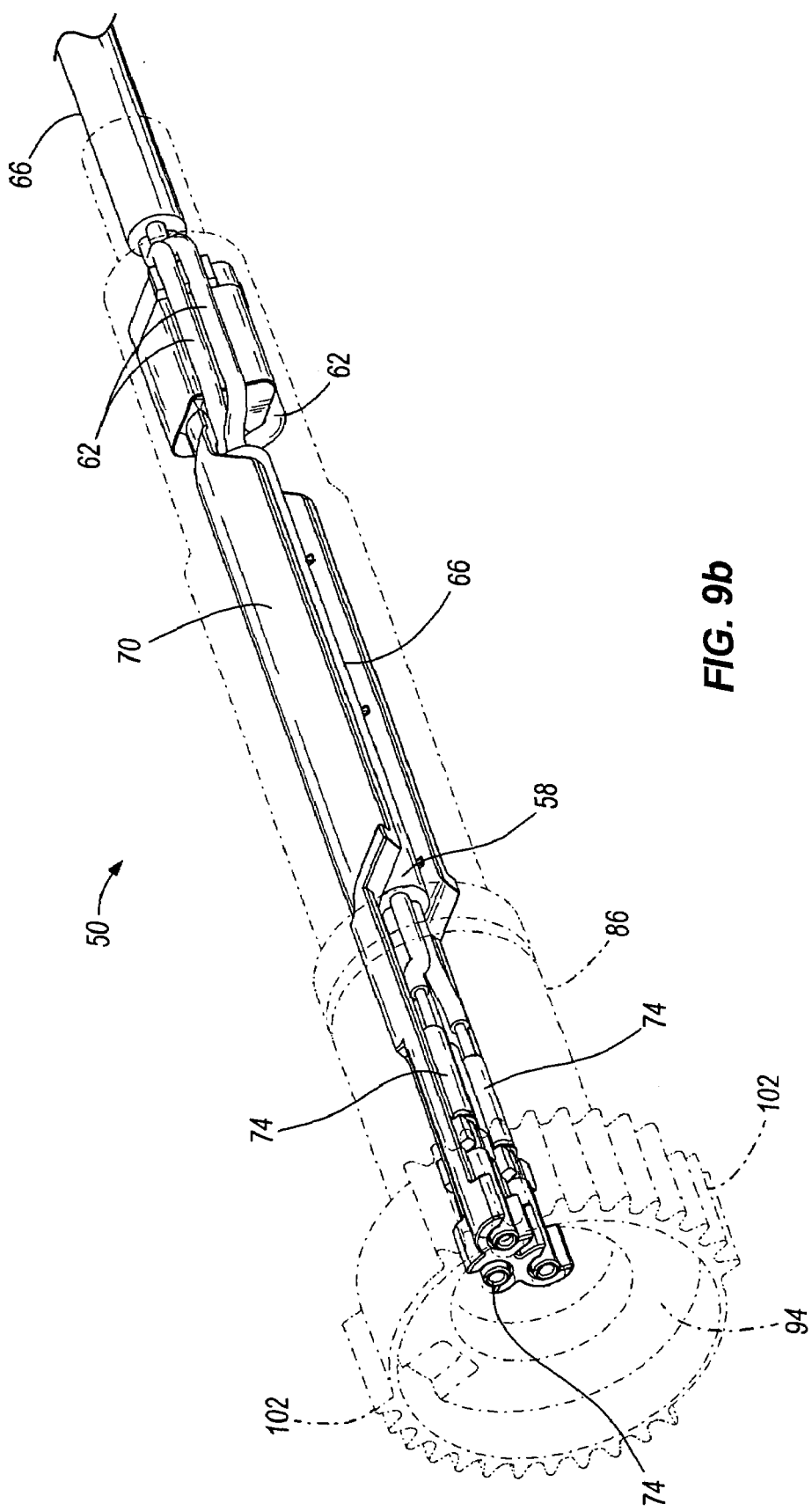

FIGS. 2 and 3 illustrate a throttle position sensor 46 adapted to be coupled to the throttle grip 38. The throttle position sensor 46 includes a rotor 50 that is rotatable relative to the handlebar 34 about a central axis 54. With reference to FIGS. 9a and 9b, the rotor 50 includes a conductor 58 having a plurality of individual electrical conduits or electrical wires 62 routed through two sheaths 66. The individual electrical wires 62 are also sheathed to insulate the wires 62 from each other. In the illustrated construction, the conductor 58 includes three individual wires 62. Alternatively, the conductor 58 may include more or less than three individual wires 62.

The rotor 50 also includes a wire holder 70 configured to support at least a portion of the conductor 58. In the illustrated construction, the wire holder 70 supports about one-half of the conductor 58. Alternatively, the wire holder 70 may be configured to support substantially the entire length of the conductor 58, or less than one-half of the conductor 58. Electrical terminals 74 are coupled to exposed ends of the individual wires 62, such that power or an electrical signal may be conducted from the individual wires 62 to the electrical terminals 74. The electrical terminals 74 are also supported by the wire holder 70. In the illustrated construction, the wire holder 70 is made from a plastic material (e.g., nylon) to substantially insulate the electrical terminals 74 from each other. Alternatively, the wire holder 70 may be made from any of a number of different non-conductive materials.

With continued reference to FIGS. 9a and 9b, the rotor 50 also includes a magnet 78 supported by the wire holder 70. The magnet 78 is positioned in a receiving portion 82 of the wire holder 70 (see also FIGS. 6 and 7). An interference fit between the magnet 78 and the receiving portion 82 may be utilized to secure the magnet 78 in the receiving portion 82. Alternatively, an adhesive (e.g., glue or epoxy) may be used to secure the magnet 78 in the receiving portion 82. In the illustrated construction, the magnet 78 is shaped as a parallelogram for insertion into the receiving portion 82, which is also shaped as a parallelogram. Alternatively, the magnet 78 and receiving portion 82 may have any of a number of different shapes. The magnet 78 may be made from a Nedymium-Iron-Boron alloy, such as that available from Hitachi Metals, Ltd. of Tokyo, Japan under the brand name HS-43EH.

As shown in FIGS. 9a and 9b, a portion of the conductor 58 around the magnet 78 is not covered by the sheaths 66. As such, on one end of the magnet 78, the individual wires 62 may be spread out and routed around the receiving portion 82 of the wire holder 70, and later converged on the opposite end of the magnet 78. By configuring the conductor 58 in this way, the portions of the conductor 58 having the sheaths 66 are substantially coaxial with the magnet 78. Alternatively, the conductor 58 and/or the individual wires 62 in the conductor 58 may be routed adjacent the magnet 78 in any of a number of different ways such that the conductor 58 is not substantially coaxial with the magnet 78.

The conductor 58, wire holder 70, magnet 78, and the electrical terminals 74, once assembled, are overmolded to substantially encase the conductor 58, wire holder 70, magnet 78, and the electrical terminals 74 by a rotor overmold 86 (shown in phantom). The rotor overmold 86 may be made from any of a number of different materials (e.g., nylon). As shown in FIGS. 2, 3, 9a, and 9b, the conductor 58 is not entirely encased by the rotor overmold 86. Particularly, the conductor 58 extends along the length of the rotor overmold 86 from a first end 90 of the rotor overmold 86 to a second end 94 of the rotor overmold 86. At least one of the individual wires 62 extending from the first end 90 of the rotor overmold 86 is electrically connected to a source of power (e.g., a motorcycle battery, not shown). At the second end 94 of the rotor overmold 86, the electrical terminals 74 are accessible for electrical connection to mating electrical terminals of an electrical component or accessory 98 (see FIG. 10).

As shown in FIGS. 2, 3, 9a, and 9b, the rotor 50 includes an engagement portion configured as a first plurality of external, axially-extending splines 102 adjacent the second end 94. The rotor 50 also includes a second plurality of external, axially-extending splines 106 (see FIGS. 2 and 3) positioned between the first end 90 and the first plurality of external, axially-extending splines 102.

With reference to FIGS. 2 and 3, the throttle position sensor 46 also includes a housing 110 configured to receive the rotor 50. In the illustrated construction, the housing 110 includes two receiving portions 114, each configured to receive a sensor assembly 118. The receiving portions 114 are located opposite each other on the housing 110, such that the respective sensor assemblies 118 may be positioned opposite each other and the rotor 50 positioned between the sensor assemblies 118. Alternatively, the housing 110 may include more or less than two receiving portions 114 to receive more or less than two sensor assemblies 118. The housing 110, at one end, also includes two cam surfaces 122 and two stop surfaces 126 adjacent the respective cam surfaces 122. The housing 110 may be made from any of a number of different materials (e.g., plastic, including nylon).

Figure 8:
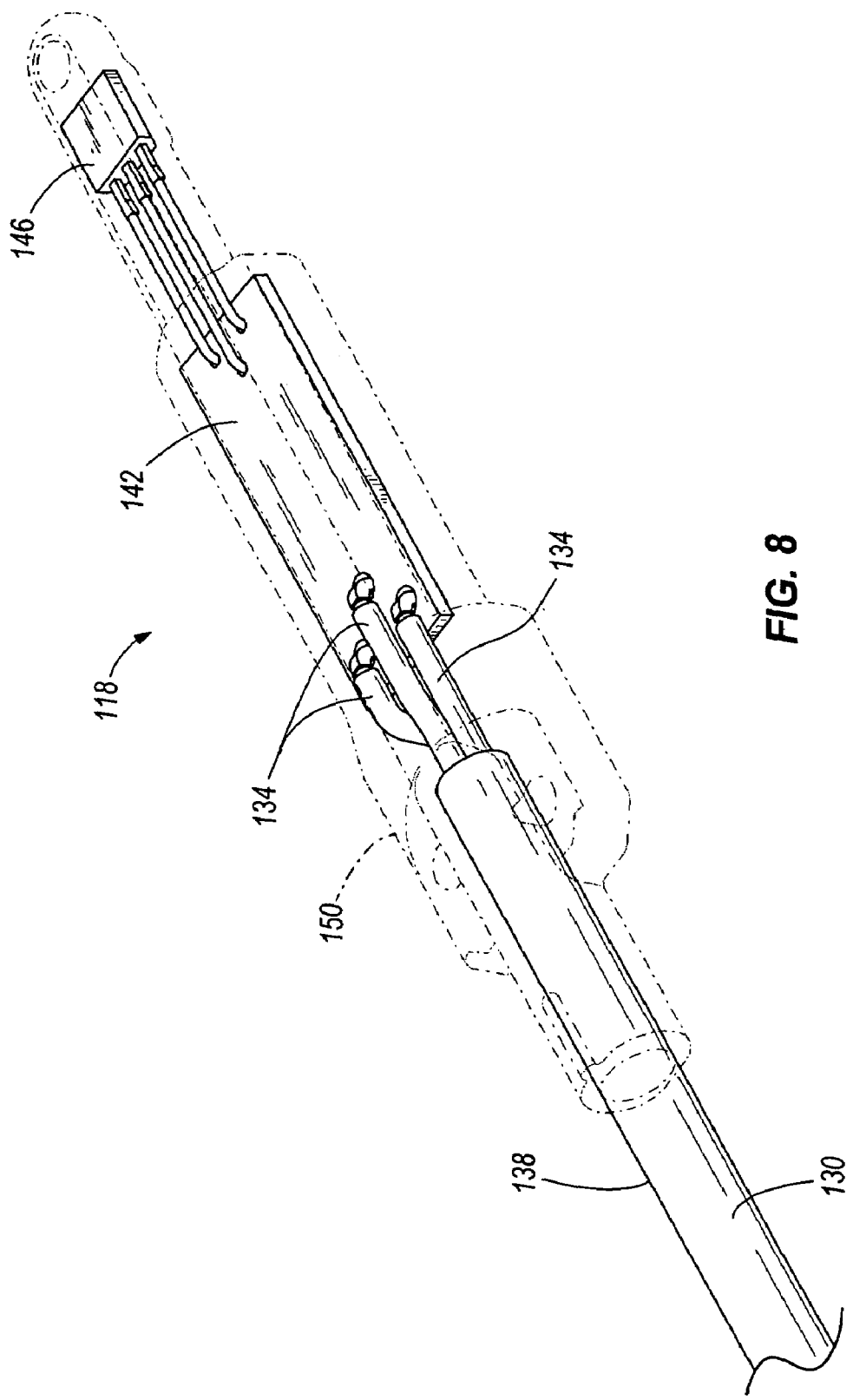
FIG. 8 is an assembled, perspective view of a sensor of the throttle position sensor of FIG. 2.

With reference to FIG. 8, the sensor assemblies 118 each include a conductor 130 having a plurality of individual electrical wires 134 routed through a sheath 138. The individual electrical wires 134 are also sheathed to insulate the wires 134 from each other. In the illustrated construction, the conductor 130 includes three individual wires 134. Exposed ends of the individual electrical wires 134 are electrically connected to a printed circuit board ("PCB") 142, which, in turn, is electrically connected to a Hall-effect sensor 146. As understood in the art, the Hall-effect sensor 146 is configured to output a voltage proportional to the sensor's movement or orientation in a magnetic field. In the illustrated construction, the Hall-effect sensor 146 includes a small semi-conductive platelet and evaluation circuitry integrated on a single silicon chip. As such, the sensor 146 may output a variable voltage (e.g., 0-5 Volts) directly to the PCB 142 to indicate the movement or orientation of the sensor 146 in the magnetic field. The sensor 146 may be a programmable linear Hall-effect sensor, such as that available from Micronas Semiconductor Holding AG of Zurich, Switzerland under the Model No. HAL815. Alternatively, other types of Hall-effect sensors may be utilized. Further, other types of sensors operable to output a variable voltage dependent upon relative movement or orientation of the rotor 50 and the housing 110 may be utilized.

As shown in FIG. 8, the conductor 130, the PCB 142, and the sensor 146, once assembled, are overmolded in a sensor overmold 150 (shown in phantom) to substantially encase the conductor 130, the PCB 142, and the sensor 146. However, the conductor 130 is not entirely encased by the sensor overmold 150. A portion of the conductor 130 extends from the sensor overmold 150, such that the individual electrical wires 134 may electrically connect with an engine control unit ("ECU," not shown) of the motorcycle 10. The sensor overmold 150 may be made from any of a number of different materials (e.g., plastic, including nylon).

With reference to FIGS. 2 and 3, the sensor assemblies 118 are positioned in the receiving portions 114 of the housing 110 and secured to the housing 110. In the illustrated construction, the sensor assemblies 118 are heat-staked to the housing 110 to secure the sensor assemblies 118 in the receiving portions 114 of the housing 110. Alternatively, fasteners (e.g., screws) or interference fits between the sensor assemblies 118 and the receiving portions 114 may instead be utilized to secure the sensor assemblies 118 in the receiving portions 114 of the housing 110.

The throttle position sensor 46 further includes a cam 154 coupled for rotation with the rotor 50, a compression spring 158 positioned between the cam 154 and the rotor 50, and a stop 162 coupled to the rotor 50 for rotation relative to the rotor 50. As shown in FIGS. 2 and 3, the cam 154 includes a plurality of internal, axially-extending splines 166 configured to engage the second plurality of external, axially-extending splines 106 on the rotor 50. As such, the cam 154 is fixed for co-rotation with the rotor 50, but is slidable along the length of the rotor 50. The cam 154 also includes two cam surfaces 170 and two stop surfaces 174 adjacent the respective cam surfaces 170. The cam surfaces 170 of the cam 154 and the cam surfaces 122 of the housing 110 have substantially similar contours, such that substantially the entire lengths of the cam surfaces 122, 170 engage each other when the cam 154 is moved to its left-most position against the housing 110 (see FIG. 4). Likewise, the stop surfaces 174 of the cam 154 and the stop surfaces 126 of the housing 110 have substantially similar contours, such that substantially the entire lengths of the stop surfaces 126, 174 engage each other when the cam 154 is moved to its left-most position against the housing 110. With continued reference to FIG. 4, the spring 158 is positioned between the cam 154 and a spring perch 178 on the rotor 50. The spring 158, therefore, biases the cam 154 against the housing 110.

The stop 162 is positioned adjacent the first plurality of external, axially-extending splines 102 and is axially secured to the rotor 50 by a C-clip 182 engaged with a groove 186 in the rotor 50 (see FIGS. 2 and 3). The stop 162, however, is not fixed for co-rotation with the rotor 50. The rotor 50 may rotate relative to the stop 162 and the housing 110. The stop 162 includes a plurality of resilient members 190 located at the outer periphery of the stop 162. The resilient members 190 are configured to engage a slot 194 adjacent an end 198 of the handlebar 34 to retain the throttle position sensor 46 in the handlebar 34 (see FIG. 10). In other embodiments, the resilient members 190 can be replaced with raised tabs that include ribs on the surfaces of the tabs that contact the walls of the slots 194. The ribs are crushed during assembly to create a robust interference fit between the tabs and the slots. In yet other embodiments, three or more tab/slot couplings can be used to reduce the endplay of the stop 162 with respect to the handlebar 34.

As shown in FIGS. 2-5, the throttle position sensor 46 also includes a tube 202 enclosing the housing 110, the sensor assemblies 118, the cam 154, the spring 158, portions of the stop 162, and portions of the rotor 50. Upon insertion into the tube 202, the housing 110 is axially restrained in the tube 202. With reference to FIG. 2, one end of the tube 202 includes multiple steps 206 formed inwardly from the outer periphery of the tube 202. The steps 206 engage corresponding slots 210 in the end of the housing 110 opposite the cam and stop surfaces 122, 126 to rotationally align the housing 110 with respect to the tube 202. The steps 206 abut respective end surfaces 214 adjacent the slots 210 to limit insertion of the housing 110 into the tube 202 (see also FIGS. 4 and 5).

Figure 4:
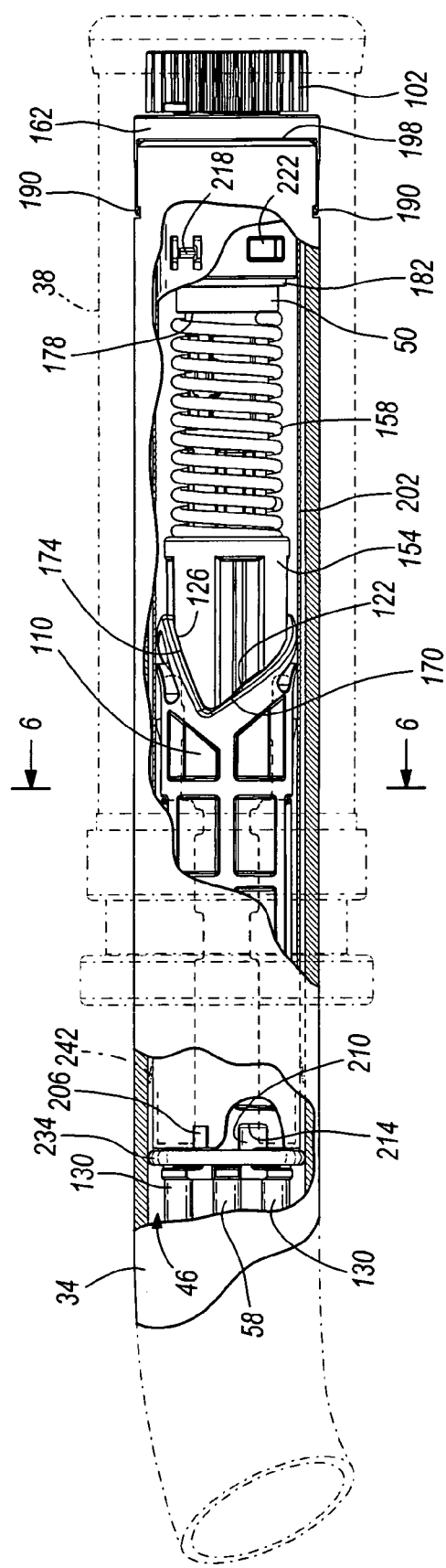
FIG. 4 is an assembled, partial-cutaway side view of the throttle position sensor of FIG. 2, illustrating the throttle position sensor with no throttle angle input.
Figure 5:
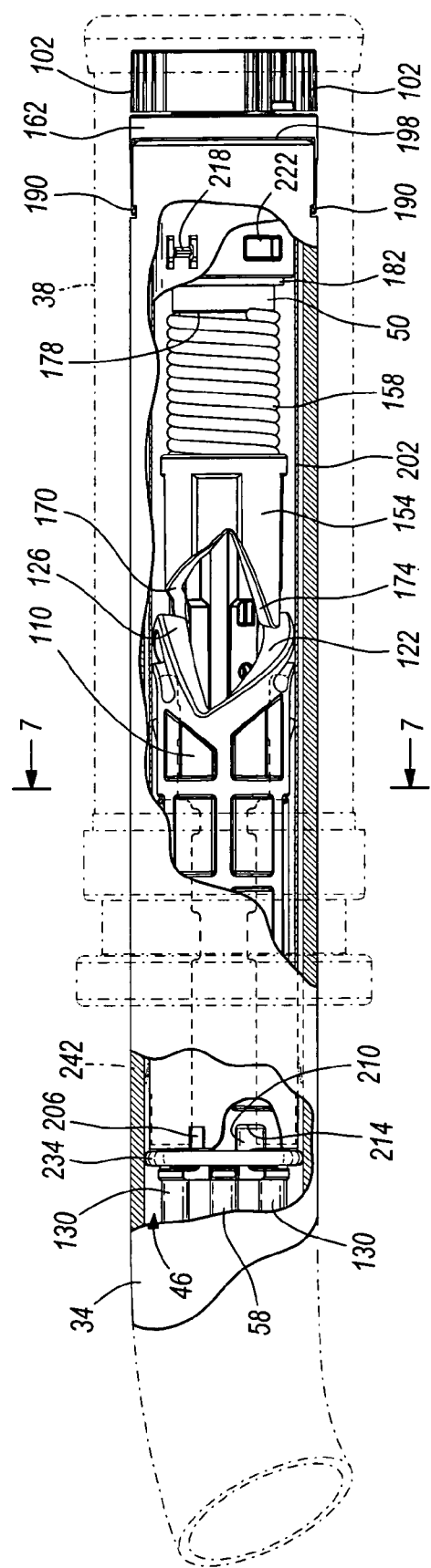
FIG. 5 is an assembled, partial-cutaway side view of the throttle position sensor of FIG. 2, illustrating the throttle position sensor with throttle angle input.

With reference to FIGS. 4 and 5, at an end of the tube 202 opposite the steps 206, the inside diameter of the tube 202 is sized to provide an interference fit with the outside diameter of the stop 162. In addition, the tube 202 at this end includes multiple resilient tabs 218 configured to engage recessed portions 222 in the stop 162 to positively retain the stop 162 in the tube 202 (see also FIGS. 2 and 3). In other embodiments, the stop 162 can include raised dimples that are captured within corresponding holes in the tube 202 to positively retain the stop 162 within the tube 202. Further, the tube 202 at the same end includes two recessed or notched portions 226 to receive corresponding raised portions 230 on the stop 162 to rotationally align the stop 162 with respect to the tube 202. Therefore, the electrical components of the throttle position sensor 46, including the sensor assemblies 118, are substantially protected inside the tube 202. In the illustrated construction, the tube 202 is made from a non-corrosive metal (e.g., zinc-plated steel). Alternatively, the tube 202 may be made from any of a number of different non-corrosive metals or structurally rigid plastic or composite materials.

Figure 10:
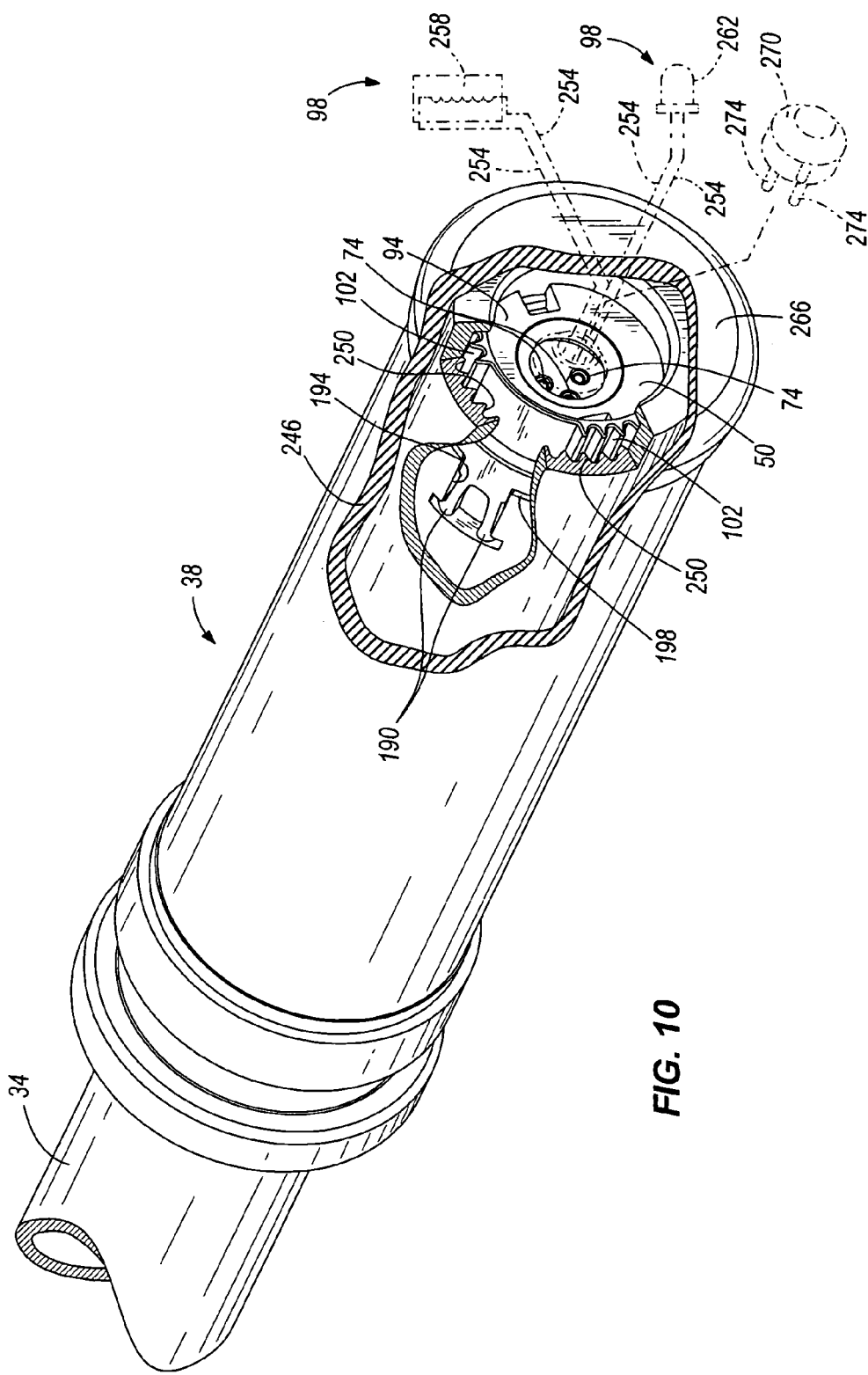
FIG. 10 is an assembled, perspective view of a throttle assembly including the throttle position sensor of FIG. 2.

With reference to FIGS. 4, 5, and 10, the throttle position sensor 46 is shown positioned inside the handlebar 34. The resilient members 190 on the stop 162 engage the slots 194 in the handlebar 34 to retain the throttle position sensor 46 substantially inside the handlebar 34 (see FIG. 10). To remove the throttle position sensor 46 from the handlebar 34, the ends of the resilient members 190 may be bent toward one another to disengage the slots 194 before removing the throttle position sensor 46.

An O-ring 234 is positioned in a groove 238 in the housing 110 (see also FIGS. 2 and 3) to compensate for any gap between the outside diameter of the tube 202 and the inside diameter of the handlebar 34. The O-ring 234 may also reduce the amount of vibration transferred from the handlebar 34 to the throttle position sensor 46. Alternatively, a plurality of resilient members or resilient tabs 242 (see also FIGS. 2 and 3) may extend from the outer surface of the tube 202 to engage the inner surface of the handlebar 34 and to compensate for any gap between the outside diameter of the tube 202 and the inside diameter of the handlebar 34. In other embodiments, the inside diameter of the handlebar 34 is sized to be snugly received within the tube 202 without the use of the O-ring 234 or resilient tabs 242.

Although not shown in the drawings, the throttle grip 38 is axially retained on the handlebar 34 by the control housing 42, as is known in the art. With reference to FIG. 10, the throttle grip 38 includes a rubber gripping surface 246 to be grasped by a rider of the motorcycle 10. The throttle grip 38 also includes an engagement portion or a plurality of internal, axially-extending splines 250 configured to engage the first plurality of external, axially-extending splines 102 on the rotor 50 when the throttle grip 38 is positioned over the end 198 of the handlebar 34. The splines 250 allow the throttle grip 38 to be oriented with respect to the handlebar 34 in a plurality of different orientations. Particularly, the splines 250, 102 allow the throttle grip 38 to be adjusted relative to the handlebar 34 in small increments (i.e., according to the pitch of the splines 250, 102), such that any graphic design or logo on the end of the throttle grip 38 may be precisely oriented with respect to the ground.

During operation of the motorcycle 10, the operator may twist the throttle grip 38 to provide a throttle angle input to the throttle position sensor 46. The throttle position sensor 46, in turn, is configured to output a signal that is proportional to the throttle angle input to the ECU. In a motorcycle 10 incorporating a fuel injection system and a cable-actuated throttle, the ECU may utilize the signal to calculate how much fuel should be added to the air entering the engine 22. After calculating how much fuel should be added, the ECU may control one or more fuel injectors (not shown) to add the requisite amount of fuel. In a motorcycle 10 incorporating a electronic throttle control, the signal output by the throttle position sensor 46 may also be used by the ECU to control the throttle opening.

With reference to FIG. 4, the throttle position sensor 46 is shown in a configuration corresponding to zero throttle angle input. In other words, the throttle opening is substantially closed, however, a sufficient amount of air is allowed through the throttle opening to allow the engine 22 to idle at a low speed. At zero throttle angle input, the throttle position sensor 46 may output a small voltage (e.g., less than 1 Volt) to the ECU so the ECU may control the one or more fuel injectors to add the appropriate amount of fuel to maintain the engine 22 at idle speed.

Without any input from the rider of the motorcycle 10, the throttle grip 38 and the throttle position sensor 46 is biased to zero throttle angle input by the engagement of the respective cam surfaces 170, 122 of the cam 154 and the housing 110. As shown in FIG. 4, the spring 158 biases the cam 154 against the housing 110. Due to the contours of the respective cam surfaces 170, 122 of the cam 154 and housing 110, an axial force on the cam 154, such as that provided by the spring 158, causes the cam 154 to rotate about the central axis 54 relative to the housing 110 until the respective stop surfaces 174, 126 of the cam 154 and housing 110 abut. The rotor 50 is forced to rotate with the cam 154 because the cam 154 is splined for co-rotation with the rotor 50.

Figure 6:
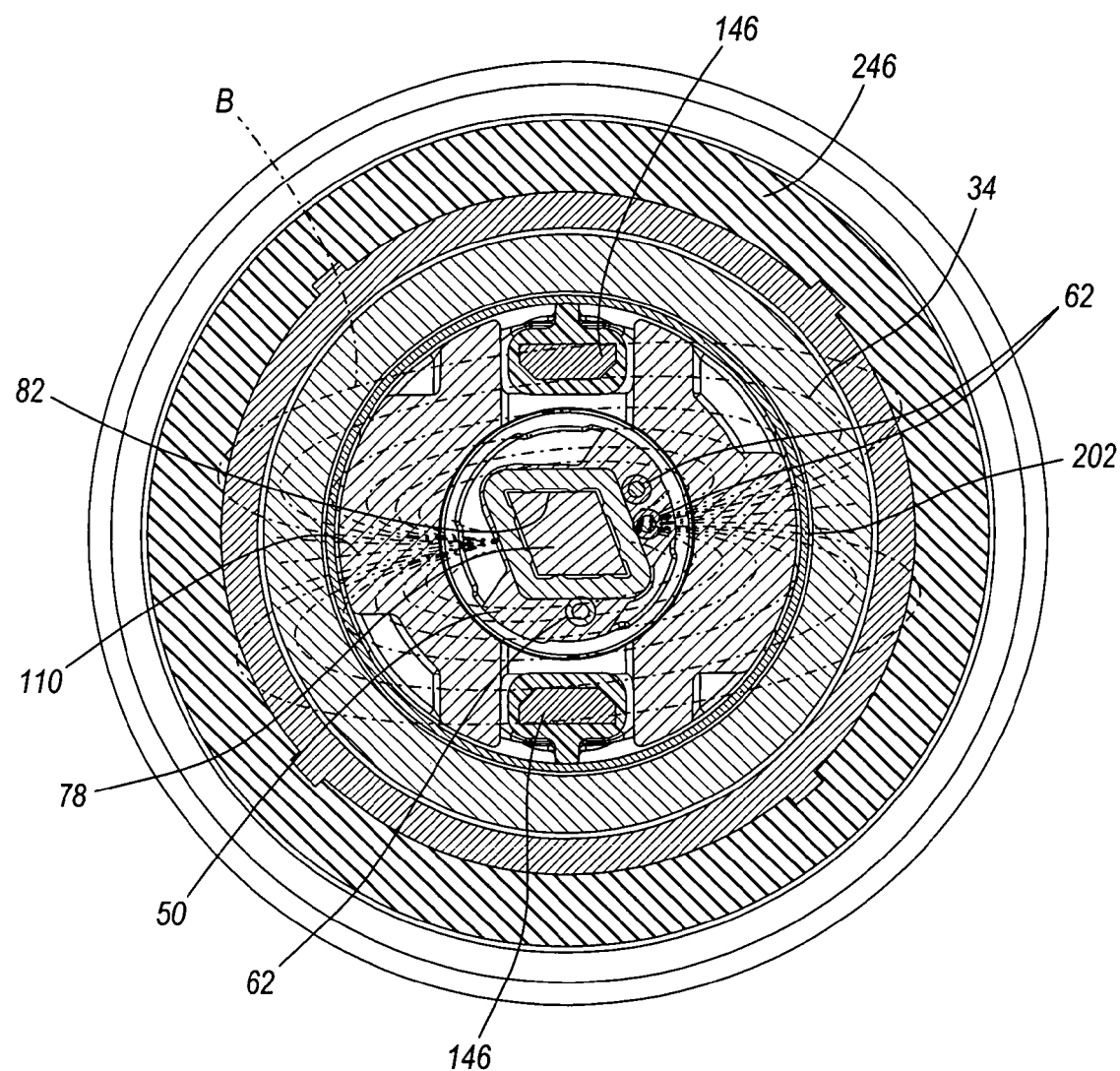
FIG. 6 is a cross-sectional view of the throttle position sensor taken through line 6-6 in FIG. 4, illustrating the orientation of a magnet of the throttle position assembly with no throttle angle input.

With reference to FIG. 6, the orientation of the magnet 78 is shown relative to the Hall-effect sensors 146 during zero throttle angle input. The magnet 78 emits a magnetic field, represented by field lines "B." Due to the orientation of the magnet 78 relative to the Hall-effect sensors 146 during zero throttle angle input, the field lines B do not substantially transversely permeate the Hall-effect sensors 146. As a result, the Hall-effect sensors 146 may output a small voltage (e.g., less than 1 Volt) to the ECU so the ECU may control the one or more fuel injectors to add the appropriate amount of fuel to maintain the engine 22 at idle speed.

When the rider of the motorcycle 10 desires to accelerate the motorcycle 10, a throttle angle input is provided to the throttle position sensor 46. Due to the engagement of the splines 250, 102 on the throttle grip 38 and the rotor 50, the rotor 50 rotates relative to the housing 110. FIG. 5 illustrates the rotor 50 in a position corresponding with full throttle angle input. Since the cam 154 is splined for co-rotation with the rotor 50, the cam 154 also rotates relative to the housing 110. Rotation of the cam 154 relative to the housing 110 causes sliding contact between the respective cam surfaces 170, 122 of the cam 154 and the housing 110, and the contours of the respective cam surfaces 170, 122 cause the cam 154 to slide along the rotor 50 away from the housing 110, against the bias of the spring 158. When the rider of the motorcycle 10 releases the throttle grip 38, the spring 158 biases the cam 154 toward the housing 110. The respective cam surfaces 170, 122 of the cam 154 and the housing 110, therefore, cause the cam 154 and the rotor 50 to rotate relative to the housing 110 as the cam 154 slides along the rotor 50. The throttle position sensor 46 is returned to zero throttle angle input when the respective stop surfaces 174, 126 of the cam 154 and the housing 110 abut.

Figure 7:
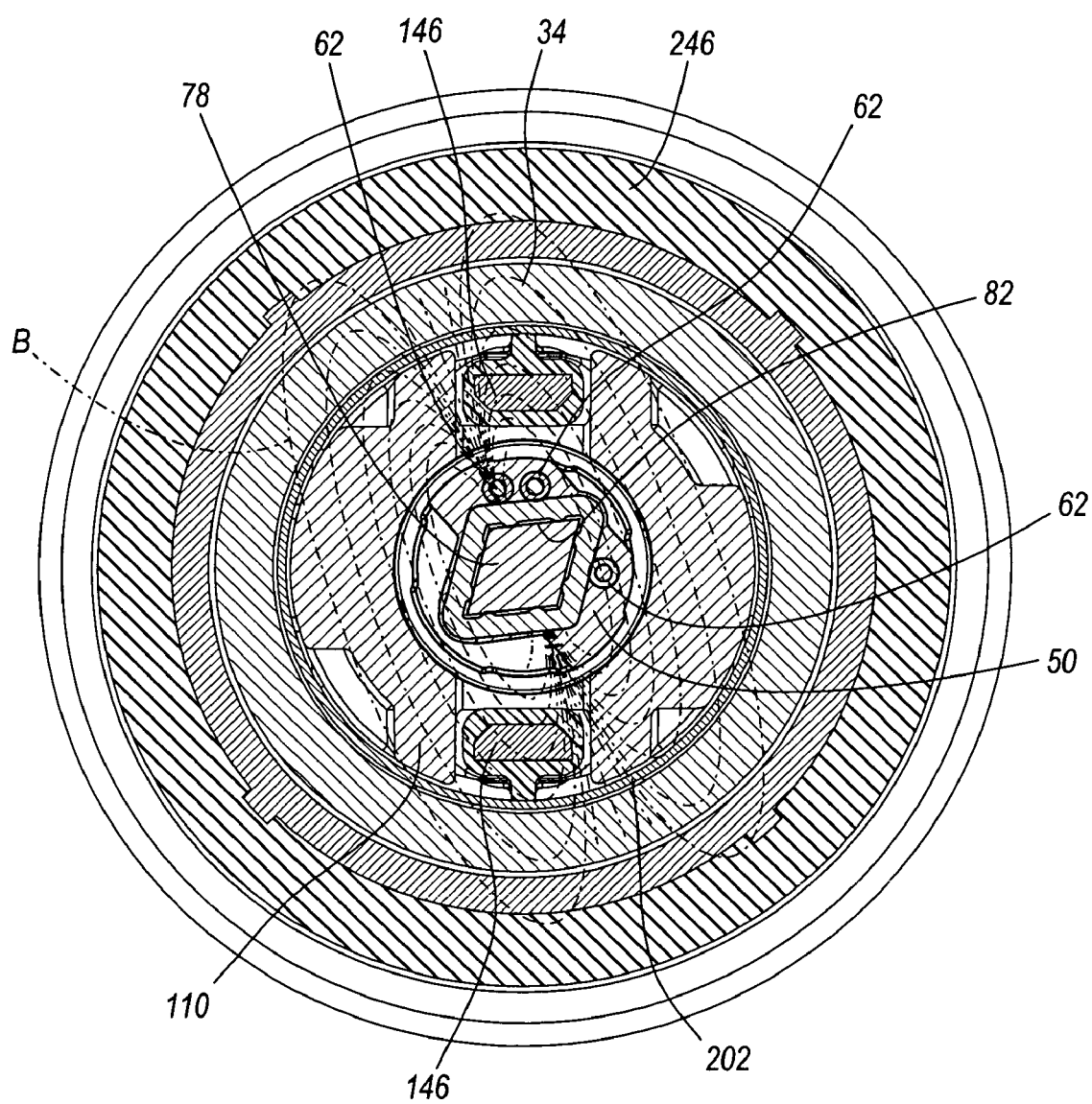
FIG. 7 is a cross-sectional view of the throttle position sensor taken through line 7-7 in FIG. 5, illustrating the orientation of the magnet of the throttle position assembly with throttle angle input.

With reference to FIG. 7, the orientation of the magnet 78 is shown relative to the Hall-effect sensors 146 during full throttle angle input. In this orientation of the magnet 78, the field lines B substantially transversely permeate the Hall-effect sensors 146. As a result, the Hall-effect sensors 146 may output a relatively large voltage (e.g., between about 4 and 5 Volts) to the ECU so the ECU may control the one or more fuel injectors to add the appropriate amount of fuel to the air passing through the throttle opening.

In the illustrated construction of the throttle position sensor 46, two sensor assemblies 118 are utilized. Incorporating two sensor assemblies 118 in the throttle position sensor 46 provides double redundancy to the fuel injection system. Specifically, one of the Hall-effect sensors 146 sweeps in a positive voltage direction (e.g., between 0 and 5 Volts) and the other Hall-effect sensor 146 sweeps in a negative voltage direction (e.g., between −5 and 0 Volts). In this manner, the sensors 146 self-check to ensure that the throttle angle input signal received by the ECU is continuous and that the quality of the throttle angle input signal received by the ECU is within specification.

With reference to FIG. 10, an electrical component or an electrical accessory 98 may be electrically connected to the electrical terminals 74. Particularly, the electrical accessory 98 may include corresponding electrical terminals 254 (shown schematically in FIG. 10) configured to plug in and electrically connect to the electrical terminals 74 in the rotor 50 to receive power from the motorcycle battery or an electrical signal from another source in the motorcycle 10. FIG. 10 schematically illustrates multiple configurations of the electrical accessory 98, including a heating element 258 and a light-emitting diode ("LED") 262. Although not shown in the drawings, one or more heating elements 258 may be molded into the throttle grip 38 and electrically connected to the electrical terminals 74 in the rotor 50 by mating electrical terminals 254. The electrical terminals 254 may be configured to engage and electrically connect with the terminals 74 in the rotor 50 upon sliding the throttle grip 38 over the end 198 of the handlebar 34.

Further, one or more LEDs 262 may be positioned adjacent a translucent end cap 266 of the throttle grip 38 to illuminate the translucent end cap 266. Like the heating elements 258, a cluster of LEDs 262 may be electrically connected to the electrical terminals 74 in the rotor 50 using one set of mating electrical terminals 254. The end cap 266 may include a graphic design or logo to be illuminated by the LEDs 262. As explained above, the splines 250, 102 allow precise adjustment of the throttle grip 38 with respect to the handlebar 34 or the ground to orient the graphic design or logo on the end cap 266 as desired by the rider of the motorcycle 10. The LEDs 262 may be activated with, among other things, the motorcycle's headlight, running lights, brake lights, and turn signals. In other embodiments, the end cap 266 may be removable from the throttle grip 38 to provide access to the electrical terminals 74.

In other embodiments of the invention, both of the heating elements 258 and the LEDs 262 may be incorporated in the throttle assembly. Since the electrical accessories 98 receive power from the motorcycle battery via the conductor 58 extending through the rotor 50 and via the electrical terminals 74, which are accessible from the end of the rotor 50, additional wiring need not be routed outside of the handlebar 34 to electrically connect to the motorcycle battery.

With continued reference to FIG. 10, a plug 270 may be engaged with the electrical terminals 74 if none of the electrical accessories 98 are utilized. The plug 270 may include multiple posts 274 to engage the respective electrical terminals 74, and the plug 270 may be made from any of a number of non-conductive plastic or composite materials.

Various features of the invention are set forth in the following claims.

What is claimed is:

1. A throttle position sensor for a motorcycle including a handlebar having an end, the throttle position sensor comprising:
   a rotor having a first end and a second end, the rotor adapted to be positioned within the handlebar and rotated relative to the handlebar, the second end being closer than the first end to the end of the handlebar;
   a sensor operable to detect rotation of the rotor relative to the handlebar and generate a signal corresponding to the rotation of the rotor relative to the handlebar; and
   at least one electrical conduit passing into the rotor from the first end, the at least one electrical conduit routed through the rotor and accessible from the second end of the rotor.

2. The throttle position sensor of claim 1, wherein the at least one electrical conduit includes a first electrical terminal accessible from the second end of the rotor.

3. The throttle position sensor of claim 2, wherein the first electrical terminal is adapted to electrically connect with a second electrical terminal of at least one of a light and a heater element.

4. The throttle position sensor of claim 1, wherein the sensor is positioned adjacent the rotor to detect rotation of the rotor relative to the handlebar.

5. The throttle position sensor of claim 1, further comprising a magnet at least partially positioned within the rotor between the first end and the second end, wherein the signal generated by the sensor varies as the magnet rotates relative to the handlebar.

6. The throttle position sensor of claim 5, wherein the magnet is substantially aligned with a central axis of the rotor, and wherein the at least one electrical conduit is routed around the magnet.

7. The throttle position sensor of claim 1, wherein the rotor includes a first engagement portion adapted to engage a second engagement portion of a throttle grip, the first and second engagement portions being engageable in a plurality of orientations with respect to each other.

8. A throttle assembly for a motorcycle including a handlebar having an end, the throttle assembly comprising:
   a throttle position sensor having a first end and a second end, the throttle position sensor adapted to be positioned inside the handlebar such that the second end is closer than the first end to the end of the handlebar, the throttle position sensor including a first electrical terminal accessible from the second end;
   a throttle grip adapted to be positioned over the end of the handlebar, the throttle grip engaging the throttle position sensor, the throttle grip being rotatable to provide a throttle angle input to the throttle position sensor such that the throttle position sensor generates a signal corresponding to the throttle angle input; and
   an electrical component including a second electrical terminal electrically connecting with the first electrical terminal.

9. The throttle assembly of claim 8, wherein the throttle position sensor includes a rotor and a sensor operable to detect rotation of the rotor relative to the handlebar, and wherein the sensor generates the signal corresponding to the throttle angle input.

10. The throttle assembly of claim 9, further comprising a magnet at least partially positioned within the rotor, wherein the sensor generates the signal as the magnet rotates relative to the handlebar.

11. The throttle assembly of claim 10, wherein the magnet is substantially aligned with a central axis of the rotor, and wherein at least one electrical conduit electrically connected to the first electrical terminal is routed around the magnet.

12. The throttle assembly of claim 8, wherein the electrical component includes at least one of a light and a heater element.

13. The throttle assembly of claim 8, wherein the throttle position sensor includes at least one electrical conduit passing into the throttle position sensor from the first end, wherein the at least one electrical conduit is electrically connected with the first electrical terminal, and wherein the electrical component receives power from a power source via the at least one electrical conduit.

14. The throttle assembly of claim 8, wherein the throttle position sensor includes a first engagement portion, wherein the throttle grip includes a second engagement portion, and wherein the first and second engagement portions are engageable in a plurality of orientations with respect to each other.

15. A throttle assembly for a motorcycle including a handlebar having an end, the throttle assembly comprising:
   a throttle position sensor adapted to be positioned within the handlebar, the throttle position sensor including a rotor having a first plurality of splines extending from an outer surface of the rotor; and
   a throttle grip adapted to be positioned over the end of the handlebar, the throttle grip including a second plurality of splines extending from an interior surface of the throttle grip, the first and second plurality of splines being engageable in a plurality of orientations with respect to each other.

16. The throttle assembly of claim 15, wherein the throttle grip is rotatable to provide a throttle angle input to the throttle position sensor, wherein the throttle position sensor includes a sensor operable to detect rotation of the rotor relative to the handlebar, and wherein the sensor generates a signal corresponding to the throttle angle input.

17. The throttle assembly of claim 16, further comprising a magnet at least partially positioned within the rotor, wherein the sensor generates the signal as the magnet rotates relative to the handlebar.

18. The throttle assembly of claim 15, wherein the throttle position sensor includes a first end and a second end, wherein the second end is positioned closer than the first end to the end of the handlebar, wherein the throttle position sensor includes a first electrical terminal accessible from the second end, and wherein the throttle assembly further includes an electrical component having a second electrical terminal electrically connecting with the first electrical terminal.

19. The throttle assembly of claim 18, wherein the electrical component includes at least one of a light and a heater element.

20. The throttle assembly of claim 18, wherein the throttle position sensor includes at least one electrical conduit passing into the throttle position sensor from the first end, wherein the at least one electrical conduit is electrically connected with the first electrical terminal, and wherein the electrical component receives power from a power source via the at least one electrical conduit.

* * * * *